United States Patent [19]
Trotta

[11] 3,977,793
[45] Aug. 31, 1976

[54] RADIATION ENERGY RECEIVER

[75] Inventor: Patrick A. Trotta, Plano, Tex.

[73] Assignee: Texas Instruments Incorporated, Dallas, Tex.

[22] Filed: Mar. 5, 1975

[21] Appl. No.: 555,746

[52] U.S. Cl................................ 356/218; 250/347; 350/23
[51] Int. Cl.² ...................... G01J 1/42; G02B 23/02
[58] Field of Search ............... 356/218; 350/23, 286; 250/347, 351, 352, 353

[56] References Cited
UNITED STATES PATENTS

| 784,852 | 3/1905 | Goerz | 350/23 |
| 3,402,296 | 9/1968 | Benedict et al. | 250/347 |
| 3,428,812 | 2/1969 | Burke | 350/23 |
| 3,594,578 | 7/1971 | Ohman | 250/347 |
| 3,631,248 | 12/1971 | Johnson | 250/347 |

Primary Examiner—John K. Corbin
Assistant Examiner—Stewart Levy
Attorney, Agent, or Firm—Harold Levine; Rene' E. Grossman; Alva H. Bandy

[57] ABSTRACT

An improved radiation energy detecting system is disclosed. The system comprises a rotating scanning mirror reflecting energy radiating from objects in the field of view through a novel image derotating prism, providing optimum transmission modulation transfer and minimal dimension for packaging, and focusing optics onto a radiant energy detecting array. The detector converts the radiant energy to electrical signals representative of the impinging radiant energy for display processing.

10 Claims, 3 Drawing Figures

RADIATION ENERGY RECEIVER

This invention relates to an improved radiation energy detecting system and more particularly to a scanner optics assembly therefor.

An infrared detector designed for wide angle azimuth field of view scanning systems present display images that appear to rotate or skew as the optical system scans an azimuth. In the past, this apparent rotation has been cancelled by spinning or rotating the optics, the detector array, electronics and, where used, the light emitting diodes for display. The infrared detector system generally includes the following sub assemblies: a scanning mirror, focusing optics, detector, detector cooler, electronics including video electronics, visible light emitting diode arrays, and a display. The disadvantage of rotating all but the display assembly is the effect on the system of the high forces imposed by the high rotational speeds required to meet, for example, the specified frame rates. These forces create excessive deformation in optic element mounts, restrict electronic packaging designs, and reduce component reliability. Suggestions to provide a sufficient number of detectors for azimuth scanning without rotation have been rejected because of the large number of electronic circuits required to process the detector element signals; the processing electronics make such a system prohibitive in size and weight.

Accordingly, it is an object of this invention to provide an improved radiation energy receiver.

Another object of the invention is to provide an infrared receiver having the practical minimum rotating elements.

Still another object of the invention is to provide an infrared receiver scanning optics assembly which includes rotating an optical image to cancel rotation produced by another optical element.

Still another object of the invention is to provide an improved infrared receiver having increased modulation transfer efficiency.

Still another object of the invention is to provide an infrared delta derotation prism for optimum transmission modulation transfer efficiency and minimal dimension for packaging a derotation assembly.

Briefly stated the improved infrared radiation receiver comprises an optics system receiving infrared radiation from objects in the field of view. The incoming radiation is reflected by a scanning mirror toward a derotation reflective means. An image traveling through the derotation reflective means such as, for example, a prism, is rotated through twice the mechanical rotation angle of the prism. Thus, by rotating the prism in the same direction as the scanning mirror at one-half the mirror speed, the image remains fixed. The detector detects the fixed image and produces electrical signals representative of the image defined by the infrared energy radiating from objects in the field of view. This arrangement permits the use of non-rotating focusing optics, detectors, cooler and signal processing electronics in the radiation energy detecting system.

These and other objects and features of the invention will become more readily understood in the following detailed description taken in conjunction with the drawings in which:

FIG. 3 is a plan view of the derotator mounting assembly.

Figure 1:
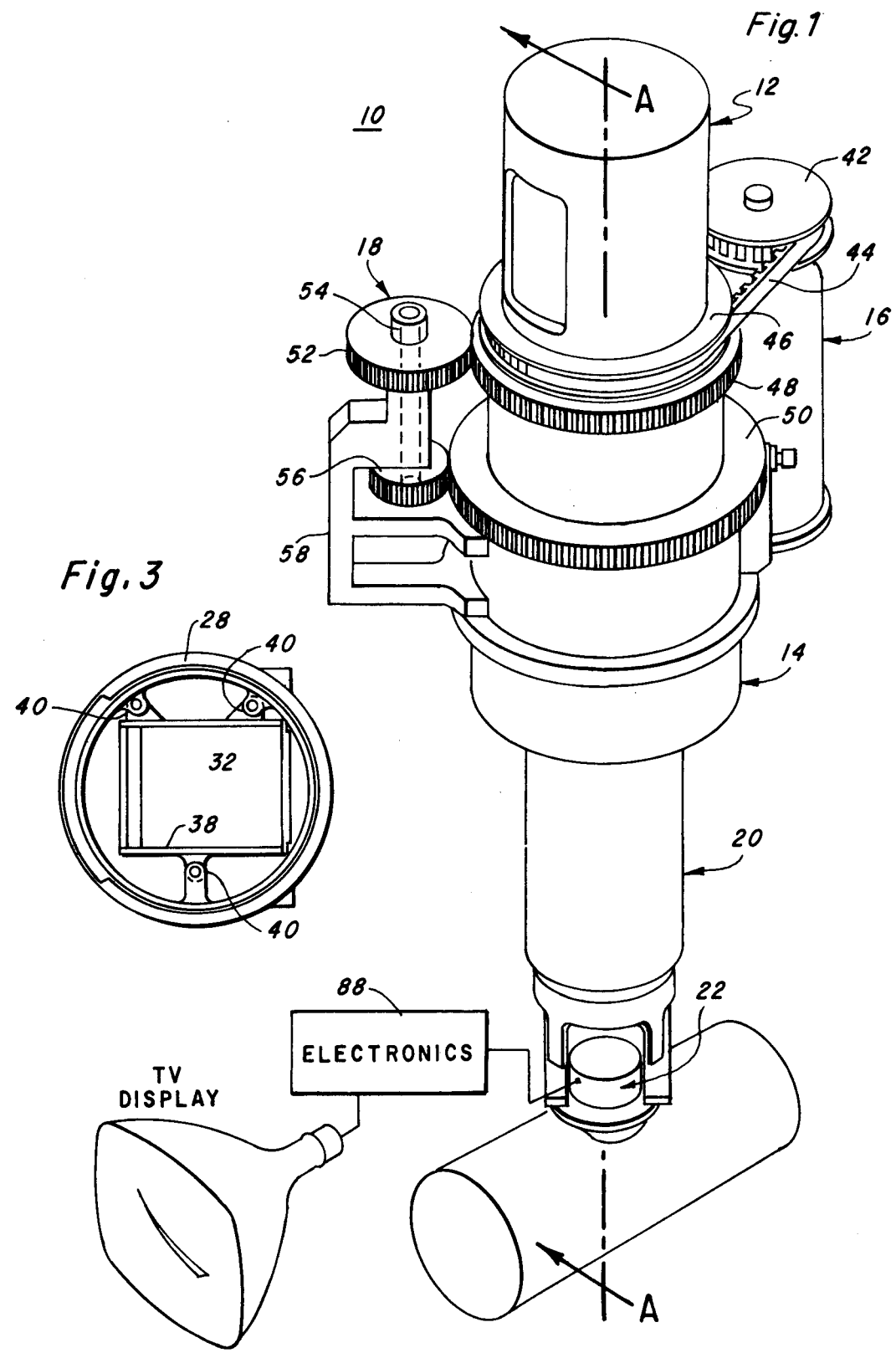
FIG. 1 is an isometric view of the improved infrared receiver rotating an optics assembly with the enclosure housing removed.

Referring to the drawings, the rotating and optics assembly 10 (FIG. 1) of the infrared receiver comprises: a rotating flat scanning mirror and housing assembly 12, an infrared delta prism utilized as a derotator in a rotating derotator and housing assembly 14, motor 16, drive assembly 18, focusing optics assembly 19, detector/Dewar assembly 22, and electronics package 88 (FIG. 2) for the system.

Figure 2:
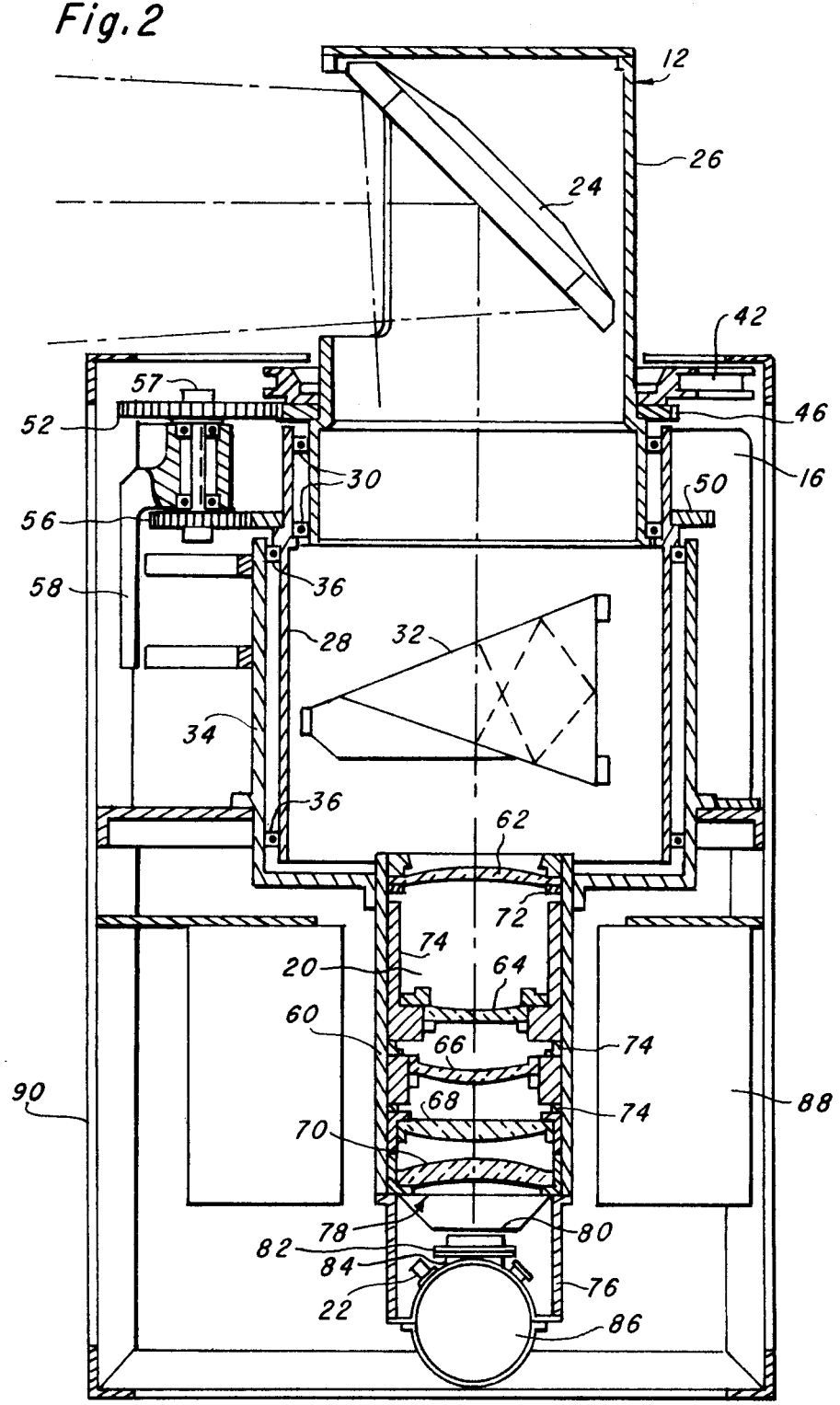
FIG. 2 is a cross-sectional view of the rotating and optics assembly taken along line A—A of FIG. 1.

The rotating flat scanning mirror and housing assembly 12, as shown in FIG. 2, comprises a scanning mirror 24 rigidly mounted in a housing 26 for rotation therewith. The mirror is fabricated of a suitable material such as, for example, beryllium and mounted in the housing at an angle 45° to the optical centerline. Flat mirror housing 26, which may be, for example, aluminum, is mounted on a derotator housing 28 with precision angular ball bearings 30. The bearings 30 are preloaded to prevent unwanted axial and radial displacement of the rotating flat mirror and housing assembly 12. As the derotator housing 28 rotates at one-half the flat mirror housing 26, as will be hereinafter explained, the bearings 30 are subjected to an absolute angular velocity of one-half the flat mirror housing angular velocity.

The derotator and housing assembly 14 comprises an infrared delta prism used as a derotator 32 mounted in the derotator housing 28 for rotation therewith. The derotator 32 comprises an isosceles prism constructed of a suitable infrared or radiant energy transmitting material. A suitable infrared transmitting material is that having an index of refraction of about 1.4 to about 4.1. The apex angle of the isosceles prism is between about 40° and about 60°. Optimum results are achieved with indices greater than 2.5 and apex angles between 45° and 50°. Infrared transmitting material appropriate for the prisms include, for example germanium, gallium aresenide, or silicon. To provide maximum modulation transfer efficiencies, the prism should be substantially free of lattice defects to prevent energy scattering, and provide the shortest energy path through the prism to reduce substantially energy absorption. Prisms actually constructed from the above mentioned materials and having apex angles between 45° and about 50°, when properly positioned to receive infrared energy, have modulation transfer efficiencies between about 80% and 96%. The prism is properly positioned in the housing 28 when the path of an undeviated ray incident parallel to the base of the prism follows the path shown in FIG. 2. This path enters at a height with respect to the prism base h which can be found by the expression:

$$h = \frac{\frac{\cos(A/2)}{\cos(A-\alpha)}B\left[\sin\left(\frac{A}{2}-\alpha\right)+\frac{1}{2}\sin\left(\frac{3}{2}A-\alpha\right)\right]}{1+2\frac{\cos\frac{A}{2}}{\cos(A-\alpha)}\tan\frac{A}{2}\sin\left(\frac{A}{2}-\alpha\right)}$$

where $A$ is the apex angle and $\alpha$ is the angle of refraction.

The derotator prism 32 is mounted (FIG. 3) in a frame 38 which rotates with the derotator housing 28 about the system optical axis. As the prism 32 must remain perpendicular to the optical axis, fine adjustment can be made to its tilt through three adjustable interconnecting flanges 40 on the prism frame 38 and on the housing 28. The derotator housing 28 may be, for example, an aluminum housing mounted on an enclosure housing 34 with precision angular ball bearings 36.

The rotating flat scanning mirror and the derotator assemblies 12 and 14 (FIGS. 1 and 2) are driven by a suitable motor 16 such as, for example, a single phase electric motor. The motor 16 provides power to bring the scanning mirror and derotator units up to speed and counteract varying friction torque and aerodynamic loading.

The drive assembly 18 driven by the motor 16 comprises a motor, pulley 42, belt 44, pulley 46 and ring gears 48, 50, 52 and 56. Pulley 42 is mounted on the power shaft of motor 16 and pulley 46 is mounted on the flat scanning mirror housing 12. Pulleys 42 and 46 are interconnected by belt 44. A ring gear 48 is mounted on the flat scanning mirror housing, and a second ring gear 50 is mounted on the derotator housing 14. Ring gears 48 and 50 are interconnected, respectively, by a power take-off gear 52 rigidly mounted adjacent one end of which meshes with ring gear 48 and a power drive gear 56 mounted adjacent the other end of shaft 54 which meshes with gear 50. In operation, the motor 16 drives the pulley 42, belt 44 and pulley 46 to rotate the flat scanning mirror housing 12. Gear 48 being attached to the housing 12 drives gear 52 to rotate through shaft 54; gear 56 to drive gear 50 attached to the derotator housing 14. The gearing ratio is such that the derotator housing 14 is driven at one-half the angular velocity of the flat scanning mirror housing 12. The gears 52 and 56 attached to shaft 54 are supported by a supporting bracket 58 attached to stationary housing 34 in which the derotator housing 28 is rotatably mounted.

The focusing optics assembly 20 comprises a rigid housing or barrel 60 (FIG. 2) containing the focusing optics. The barrel 60 is located directly beneath the image rotator and contains the optical focusing system which may be, for example, an F/1.0 optical system which has about a 2.52 inch aperture. Focusing optics, as shown in FIG. 2, consists of five lens elements 62, 64, 66, 68, and 70. Lenses 62, 68 and 70 are silicon lenses, and lenses 64 and 66 are germanium lenses. Each lens is centered in a stainless steel cell 72 and each of these lens cells is then slipped into the precisely bored optics barrel 60. The individual lens cells are separated in the barrel by lapped spacers 74. Nylon tip set screws (not shown) force all of the lens cells to one side of the barrel.

The detector/Dewar assembly 22 comprises a housing 76 which supports at one end adjacent the focusing optics assembly, a silicon Dewar window 78 and reticle 80. A detector array 82 is mounted on the cold finger 84 of Dewar 86. The detector array may be, for example, an array of mercury, cadmium, telluride detector elements or mercury, tin, telluride detector elements, and the cooler may be, for example, either a stainless steel liquid nitrogen Dewar, or the cold finger of a small Stirling cycle type refrigerator. In operation the cooler maintains the detector array at an operating temperature, which for a HgCdTe detector is about 77°K. A suitable refrigerator is that disclosed in U.S. Pat. No. 3,851,173 issued Nov. 26, 1974.

The electronics is mounted in a housing 88 which constitutes an electromagnetic insulating shield attached to an enclosure housing 90. The electronics package 88 includes the usual detector signal preamplifiers and electrical circuits controlling the operation of the scanning optics assembly which includes two printed wiring boards (not shown) housed behind the Dewar. The two boards contain circuits well known to those skilled in the art to perform the following functions: scan mirror drive, servo amplifier and preamplifier saturation decoder circuits; and reference frequency amplifier, tachometer, optics temperature control and azimuth synchronization circuits. The housing 88 is made of tin-plated nickel-copper-iron alloy sold under the trademark Mumetal, and is completely electromagnetic interference type.

In operation of the radiation energy detector, infrared radiation from objects in the field of view of the systems optics is focused on the detector array 82 as follows: the incoming radiation is reflected by the scanning mirror 24 toward the derotation reflective prism 32. An image traveling through the prism 32 is rotated through twice the mechanical rotation angle of the prism. Thus, by rotating the prism in the same direction as the scanning mirror at one-half the scanning mirror speed, a stationary image leaves the derotator. The image passes through the focusing system which focuses the image on the detector array 82. The detector array 82 converts the infrared energy into electrical signals. These signals are conducted to the preamplifiers contained in preamplifier housing 88. The detector signal preamplifiers outputs are connected to suitable signal processors, not shown, for processing the signals into an intelligible form such as a display or alarm. It will be appreciated that where size economy dictates, a focusing system can be included between the rotating flat mirror and the derotator to decrease the size of the derotator prism; such a structure is desirable when the modulation transfer efficiency is improved.

Although a preferred embodiment of the invention has been described herein, it will be apparent to a person skilled in the art that the infrared delta prism may be utilized in forward look infrared (FLIR) devices and that other various modifications to the details of construction shown and described may be made without departing from the scope of this invention.

What is claimed is:

1. An infrared radiation energy detection system comprising:
    a. a first rotatable housing;
    b. a scanning means mounted in the first rotatable housing for scanning infrared energy radiating from objects in the field of view;
    c. a second rotatable housing;
    d. a delta prism mounted in the second rotatable housing in the optical path of the scanning means;
    e. a rotatable means for rotating said first and second housings in a preselected relationship one to the other, whereby the delta prism derotates the rotating image of the scanning means;
    f. focusing means in the optical path of the delta prism for focusing the image reflected by the scanning means;
    g. detector means reponsive to the focused image to produce electrical signals representative of the radiant energy impinging thereon; and
    h. electronic means for processing the electrical signals of the detector means into an intelligible format.

2. An infrared radiation energy detection system according to claim 1 wherein the delta prism is positioned in the optical path to receive an undeviated ray incident parallel to the base of the prism at a height as to the prism base determined by the expression:

$$h = \frac{\cos(A/2)/\cos(A-\alpha) \; B \; [\sin(A/2 - \alpha) + \frac{1}{3}\sin(3/2A - \alpha)]}{1 + 2\cos A/2 \cos(A-\alpha) \tan A/2 \sin(A/2 - \alpha)}$$

where $A$ is the apex angle and $\alpha$ is the angle of refraction.

3. An infrared radiation energy detection system according to claim 1 wherein the delta prism is mounted in an adjustable frame attached to the second rotatable housing.

4. An infrared radiation enery detection system according to claim 1 wherein the rotating means includes a motor, a first ring gear rigidly attached to the first rotatable housing for rotation therewith responsive to the motor, a follower gear meshing with the first ring gear, the follower gear rigidly attached to a rotatable shaft supported independently of the first rotating housing and second rotatable housing, a drive gear rigidly attached to the rotatable shaft, said drive gear operably responsive to rotation of the shaft by the follower gear rotating responsive to the first rotatable housing ring gear, and a second ring gear rigidly attached to the second rotatable housing in meshing engagement with the drive gear for rotating the second rotatable housing.

5. An infrared radiation energy detection system according to claim 1 wherein the focusing means includes a lens barrel, a plurality of lenses, said plurality of lenses each adjustably mounted in a lens cell, said plurality of lens cells mounted in the lens barrel with spacers selectively spacing the lens cells.

6. An infrared radiation energy detection system according to claim 1 further including a Dewar for cooling the detector means to its operating temperature.

7. An infrared radiation energy detection system according to claim 1 further including a refrigerator for cooling the detector means to its operating temperature.

8. An infrared radiation energy detection system according to claim 1 wherein said delta prism has an index or refraction of about 2.5 to about 4.1 for providing a compact, highly efficient system.

9. An infrared radiation energy detection system according to claim 8 wherein said delta prism is a prism of radiant energy transmitting material having an apex angle between about 40° to about 60°.

10. An infrared radiation energy detection system according to claim 9 wherein said delta prism of radiant energy transmitting material is selected from the group consisting of silicon, germanium and gallium arsenide.

* * * * *